United States Patent Office 3,426,504
Patented Feb. 11, 1969

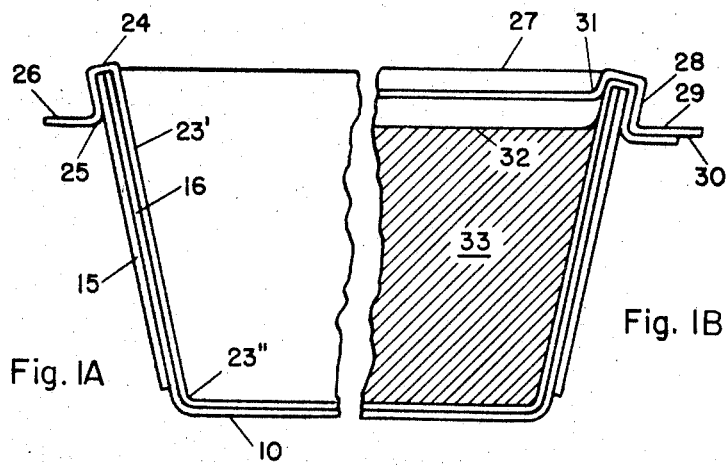
Fig. 1A
Fig. 1B
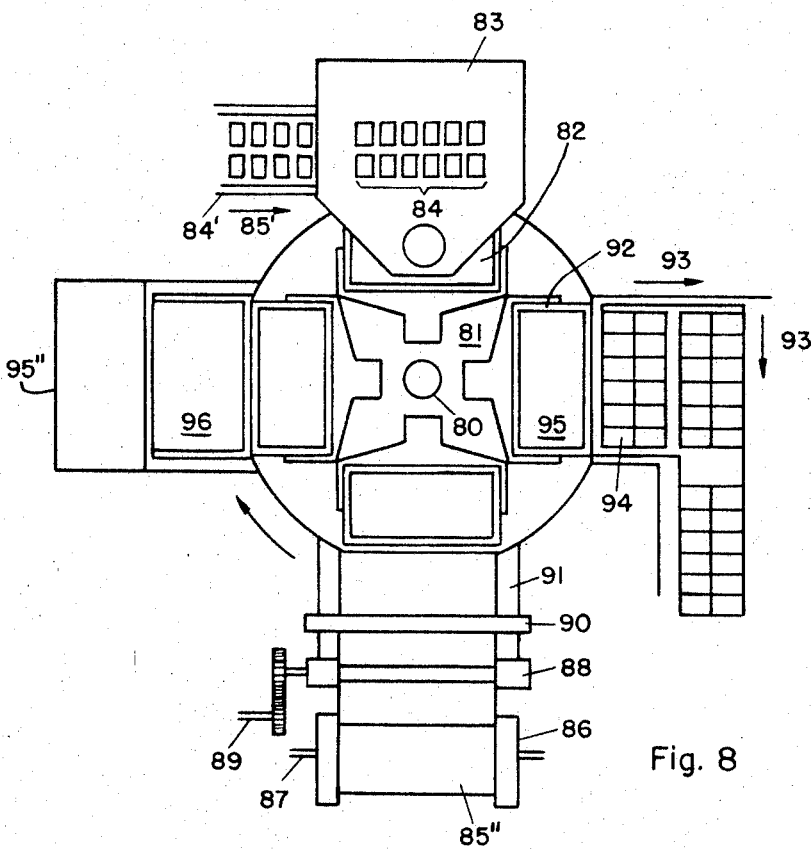
Fig. 8
INVENTOR
OD WIKAR CHRISTENSSON

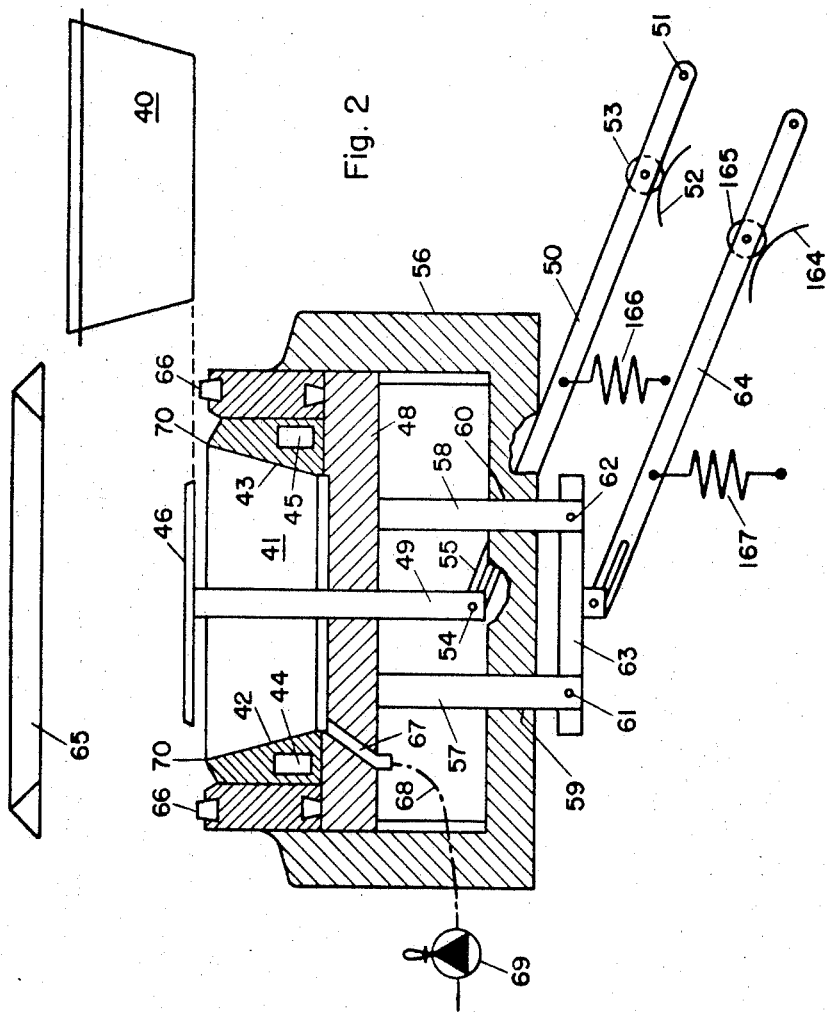

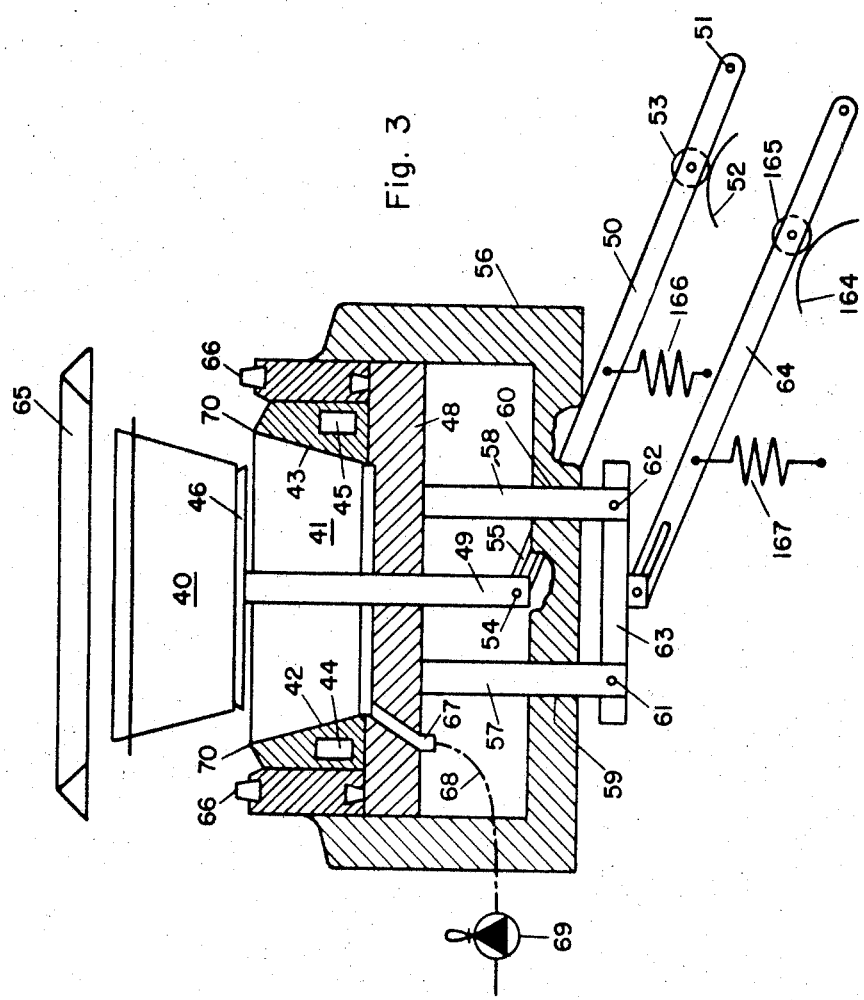

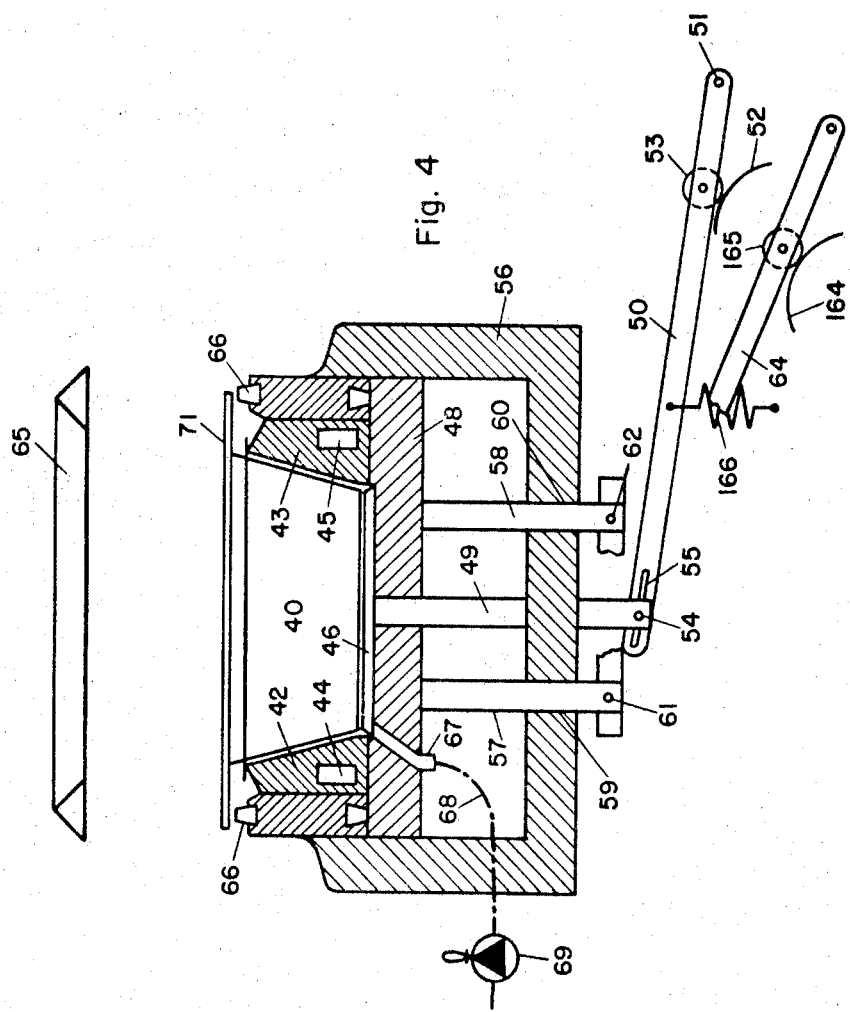

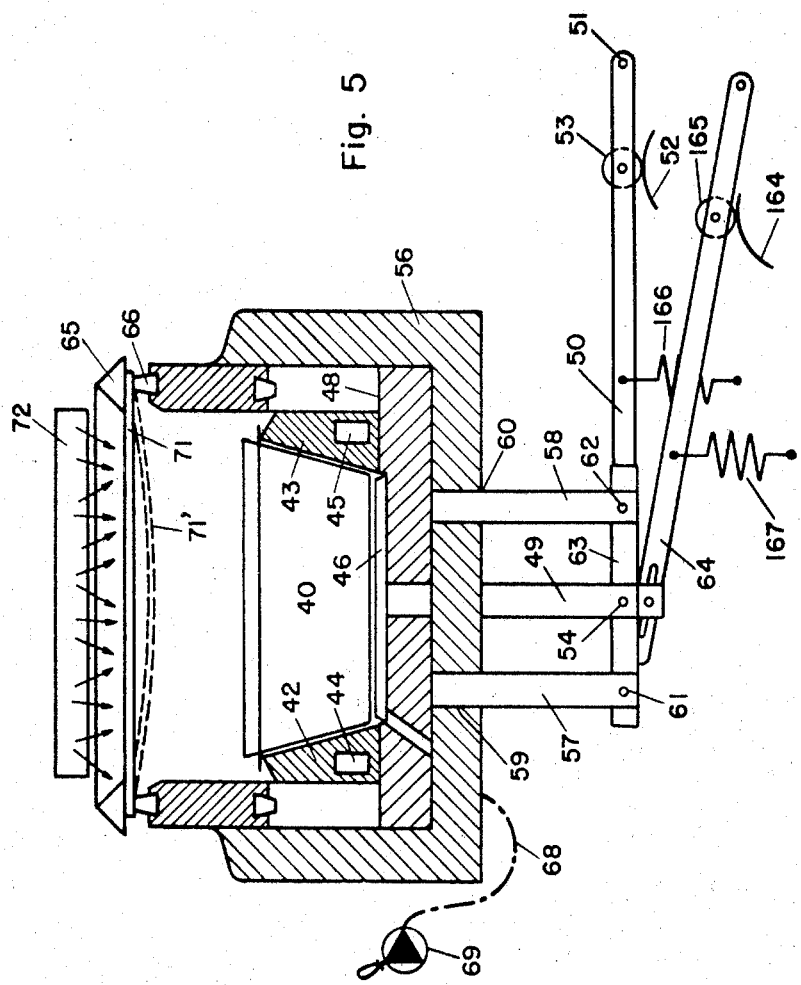

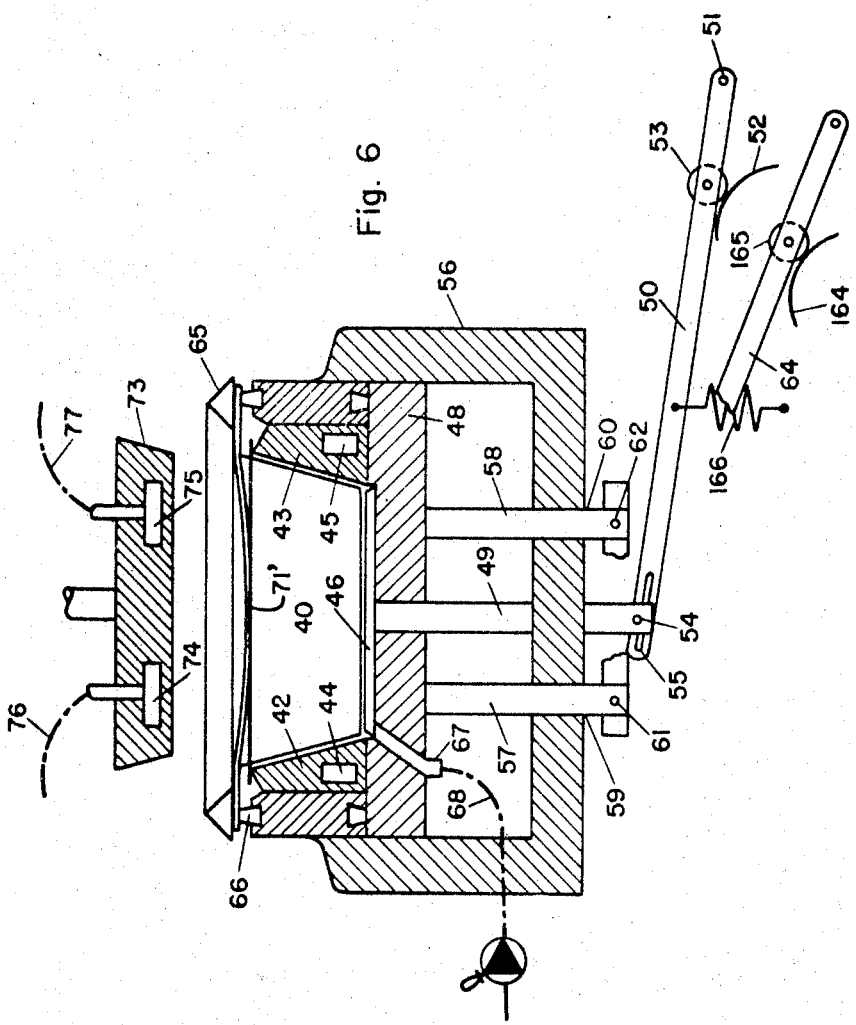

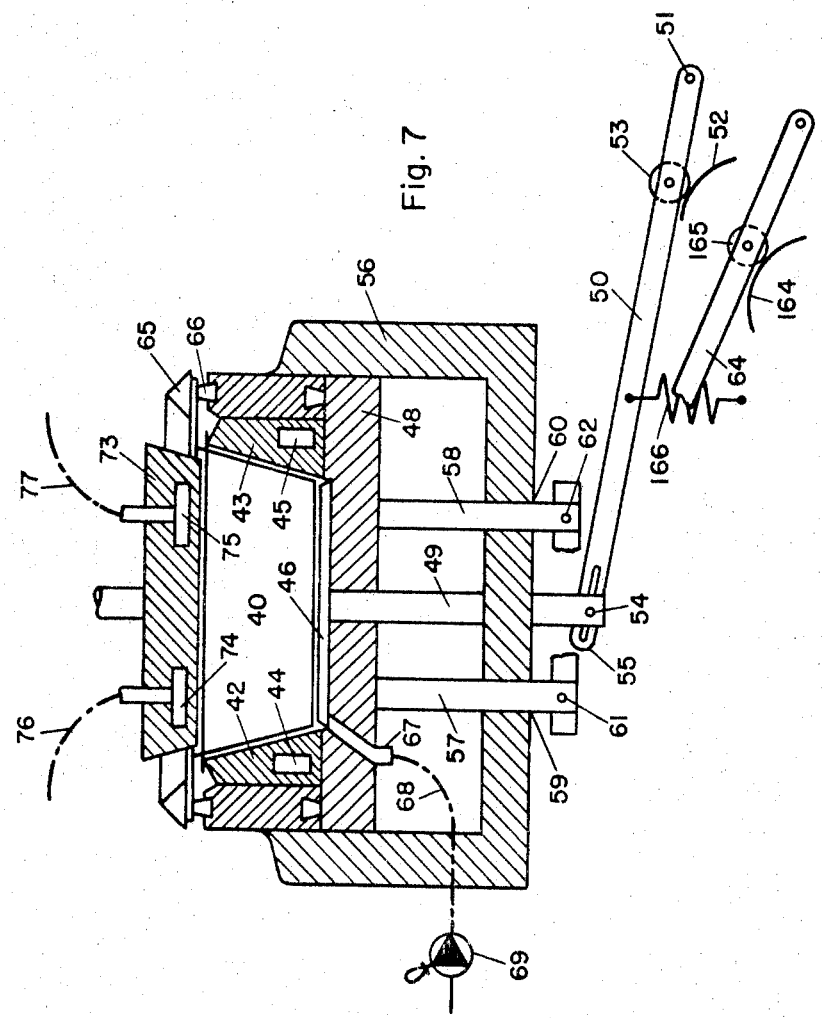

3,426,504
ARRANGEMENT FOR CLOSING PLASTIC LINED
PACKAGES
Od Wikar Christensson, Ekbacksvagen 32–34, Ulvsunda, near Stockholm, Sweden
Filed Sept. 13, 1965, Ser. No. 486,782
Claims priority, application Sweden, Oct. 22, 1964, 12,700/64
U.S. Cl. 53—141       11 Claims
Int. Cl. B65b 53/02, 7/28, 61/00

ABSTRACT OF THE DISCLOSURE

An arrangement for placing a closure formed of a thin sheet onto the open end of a cup-shaped package including a first support member having a mould for holding the package and a second support member for holding the end sheet. The two support members are movable relative to each other and in all relative positions the space between the package and the thin sheet is substantially enclosed. A heating element is provided for heating the thin sheet when the first support member has moved, relative to the second support member, to space the package from the sheet. The mould includes a separate bottom which rests on a plate and guide means are included for guiding movement of the mould bottom and the plate.

---

The inventor has proposed a type of package, consisting in a frame of card-board or similar material, which is lined on its inner side by a thin plastic skin, attached to said inner side, which extends around the upper edge of the package frame and a small distance down on its outer side, where same plastic liner is bent outwardly from the package frame to form a flange.

The inventor has also in a co-pending patent application proposed to provide such packages with a cover by heat-drawing of plastic directly upon the ready packed package.

By such a package one will gain different advantages, amongst which should be mentioned good adaptation between the package and its cover, so that a satisfactory tightening will be created, further a completely good hygiene, as far as the product, usually some foodstuff, which is packed in the package, will not be in contact with human hands because the mounting of the cover will take place completely by machine work.

The present invention refers to a machine for use in mounting the cover.

The foodstuffs, which will usually be packed in packages of the above-mentioned type rather often are sensitive to heat. This is for instance the case with edible fats such as butter and margarine, which, if they are heated to temperatures above the normal room temperature are quickly changing in color and taste, and even at normal room temperature are slowly changed in the said respects. An other example is all kinds of fruit or berry jellies and marmalades, which contain pectine. It is well known that pectine which has once stiffened into jelly will be split up, when heated again, into a thin fluent substance, which will not allow for another formation of a gel.

It seems at first sight as it wouldn't be possible to add a cover to a package of the above mentioned type, containing such food stuffs, sensitive to heat, without damaging them. The heat, which has to be given to the cover forming plastic, should reasonably to a given extent be transferred to the foodstuffs, present in the package, and these would then be damaged in the above-mentioned way.

Intimate researches, however, have proved that there is a possibility to avoid such damages by substantially shortening the period of time during which the plastic is in the vicinity of the food stuff in a hot state. Same investigations also have proved that the plastic should not be heated too quickly because too quick heating easily causes uneven heating of the plastic with the consequence that the cover will be imperfect, but that, on the other hand, the forming of the cover on the package may take place very quickly.

In accordance with this understanding, the present invention is based upon that the package with the food stuffs should be kept in distance from the plastic during the heating period of same, and only for a short time be in the vicinity of the hot plastic during the proper heat drawing over the package, and that this should take place as quick as possible, preferably under simultaneous cooling of the plastic.

In accordance with this principle the machine comprises one part which contains a heater element for heating a disk of plastic for formation of a cover on the package, and a second part which carries up the package together with means to be used during the heat drawing. These two parts, however, are movable relative to each other guided by a common guiding means, which keeps both of said arrangements in distance from each other during the heating period of the plastic and which will only for a short period of time put them together at the time when the heated disk of plastic is heat drawn over the package to form its cover.

Further details of the invention will be apparent from the following description of a couple of different forms of execution of the invention under reference to the attached drawings, which show in FIGS. 1A and 1B a package of the type, which may for instance be provided with a cover of plastic when using the machine according to the invention. FIGS. 2, 3, 4, 5, 6 and 7 show in strongly schematic form a first machine according to the invention in the different states of work, in which the machine will be during its function. FIG. 8 shows another form of execution of a machine according to the invention.

The package shown in FIG. 1A is the package before it is provided with the cover, whereas FIG. 1B shows the same package as provided with the cover. The skin of plastic forming the liner in the package, as a matter of fact, is extremely thin. For making the drawing more clear, it has however been shown in FIGS. 1A and 1B substantially thicker than is really the case.

The frame of the package in this case is made of cardboard, which has been folded in such a way that it will form a bottom 10 and four sides perpendicularly to each other, the side 15 being shown in section. The corners between each of the four sides, on the one hand, and the bottom 10, on the other hand, have been marked by creasing lines, and consequently they will get rather sharp. On the other hand the edges between the different sides have not been marked this way, and as a consequence thereof they get more rounded.

The plastic liner 23' extends over all of the inner surface of the package and around the upper edge thereof at the place 24, downwardly a small distance 25 on its outer side and is thereafter arranged to form a flange 26, which extends substantially in parallel to the bottom 10 of the package. For keeping the frame of the package together, said frame being made by folding from a blank of card-board, are two opposite sides doubled, as shown by 15 and 16.

Such a package is now filled with a product to be packed. This product, which is indicated in FIG. 1B by 33, may for instance be a food stuff such as butter, margarine, fruit jelly or the like, which is sensitive to heat. Often it is desirable in order of protecting the product from the influence of the heat, to cover same, and for this purpose a foil of for instance aluminum 32 has been introduced. The forming of the cover shall take place by means of a heated disk of some suitably shaped plastic, for instance poly vinyl chloride, which achieves its weakening at a temperature between 60° and 70° C. This temperature, however, is very detrimental to such foodstuffs, which are in the way mentioned above sensitive to heat, and the machine according to the invention has for its purpose to protect the food stuffs from the influence of the heat from the plastic, when this is formed by heat drawing to a cover 27.

The cover should preferably be drawn down over the edge of the package so that it will follow the outer side of the package a small distance downwardly as indicated at 28, an also follows the inner side of the package somewhat downwards as indicated at 31. On the cover a grip tounge may be provided by means of which the cover may be removed, when the package shall be opened.

The sides of the package are inclined outwardly. This causes the removal of the packed food stuff more easy, by usual eating tools such as a spoon, a knife or the like, and also to keep the cover better attached to the outer surface of the package, along which it is undercut.

In FIG. 2 the package 40 is shown on its way to the machine. This machine may be made for a great number of simultaneous productions of covers, but as it will be obvious to any man skilled in the art, how the machine should be made for this purpose, after he has got knowledge about how the machine is made for one single package, only those parts have been shown in FIG. 2 as a matter of simplification, which regard the creation of the cover on the just mentioned package 40.

At the time when the package shall be introduced into the machine it is in the state, which is schematically indicated in FIG. 2.

A mould 41 for receiving the package is in its elevated position. This mould consists in walls 42, 43, which preferably contain cooling channels 44, 45 for a suitable coolant such as air, water, oil or the like. The mold is provided with a bottom, which is, however, elevated into the position 46 in the state, shown in FIG. 2. Normally this bottom is positioned in a recess in a holder 48, which carries up the mould walls 42, 43 and so on. The bottom 46 has been transferred into this position by being carried up by a displaceable bar 49, which is at its lower end hinged to an arm 50, which may be swung about the joint 51 under influence from a cam disk with follower pulley 53. The joint 54 between the bar 49 and the arm 50 contains a pin, which is displaceable within a slot 55 in the arm 50.

The holder 48 is slidably provided in the frame 56, thereby being guided by a couple of guides 57, 58 running in bearings 59 and 60 respectively. By means of joints 61, 62, which are only schematically indicated in the drawing, the holder 48 may be lowered or elevated. The joints are mutually connected by means of a yoke 63, which is in turn moveably connected with an arm 64, which is guided by a second cam disk 164 with follow up pulley 165. Both of the cam disks 52 and 164 are preferably rigidly connected to a common control shaft, which is not shown in the drawing. The arms 50 and 64 are under influence of an extension spring 166, 167, which holds the follow up pulleys 53 and 165 in contact against the cam disks 52 and 164, respectively.

In a similar way, although not shown in the drawing, a frame 65 is guided. This is provided above the parts just described, so that it will be lowered from its elevated position shown in FIG. 2, down into a position, which will be further described below. Thereby it has for its purpose to press a disk of plastics, from which the cover shall be produced by heat drawing, onto the package 66 on the frame 56.

The space 41 is by means of a channel 67 and a flexible conduit 68 connected to a valve 69, which is introduced into a conduit for feeding vacuum for heat drawing of the part of the disk of plastics, which is situated outside of the edge of the package 40.

In the position shown in FIG. 2, thus the frame 65 is in its elevated position, and no disk of plastics has yet been introduced into the machine. The valve 69 is closed.

By means of traditional transportation means, which are not shown in the drawing, the package 40 is now brought into the machine, so that it rests upon the elevated bottom 46. This may take place by the package being brought into this position by hand, but preferably it should take place by mechanical transportation means. As these do not form part of the present invention, they have not been shown in the drawing.

After the package 40 has been brought into the machine so that it rests upon the bottom plate 46, the machine is in the state which is shown in FIG. 3. The cam disk 52 is in continuous rotation in synchronism with the remaining control means in the machine. It now causes the arm 50 to swing in anti-clockwise direction, whereby the bottom 46 with the package 40 resting thereon is lowered down into the interior of the mould 41. This movement being completed, the machine is in the position shown in FIG. 4. It should be observed that the mould is exactly adapted to the part of the package which lies below the flange 26–29 in FIG. 1B, and this flange will therefor rest upon the upper end 70 of the sides 42 and 43 of the mould 41. Immediately after the package has assumed the position as shown in FIG. 4, is the plastic disk 71 introduced from the side, said plastic disk being intended to form the cover on the package. It will then rest more or less tightly on the packing 66 but it is still stiff, because it has not yet been heated.

The next step in the machine operation after this is that during the continuous rotation of the cam disks 52 and 164 they will turn the arms 50 and 64 in anti-clockwise direction past the position which is shown in FIG. 4. In the position shown in FIG. 4, the bottom 46 has in full entered into the deepening in the holder 48, and when the bottom is now brought further downwards by influence from the cam disk 52 and the arm 50, it will follow the holder 48 together with the mould 41 in their downward movement under influence of the springs 166 and 167, which is for a purpose, which will be evident from the following. This downward movement will continue until the package 40 in the mould 41 together with the holder 48 has got into a position, which is shown in FIG. 5. Simultaneously with this movement, however, also the frame 65 is moved downward so that it will now clamp the disk of plastic 71 between itself and the packing 66. Immediately thereafter a heat radiation element 72 is moved in from the side to a place above the frame 65, so that the heat given given off by said element will radiate onto the disk of plastic 71 and weaken it. The disk of plastic 71 bends by its proper weight and will get the position indicated in FIG. 5 by dotted lines and indicated 71'.

During the heating of the disk of plastic 71, the package 40 is therefore in a strongly lowered position in distance from the hot disk of plastic and without any possibility of receiving heat from the radiation element 72, and therefore there is no danger for destruction of the products in the package due to heat being fed to them. The heating of the disk of plastic without the package being placed immediately under it has also another advantage. It is shown in FIG. 5 that the disk of plastic bends down by its proper weight into a somewhat cup-formed shape 71'. This causes the middle part of the disk of plastic to be positioned closer to the package, when this is again elevated. If there is only one package, as shown in the simplified form of execution, shown in the drawings, this will perhaps be of less importance, but if one provides a great number of packages with covers in a common procedure, so that they are arranged in a given pattern, and above them is a common disk of plastic, the lowering of the middle part of said disk of plastic will contribute to the disk of plastic first contacting the packages in the middle, when they are again elevated, and thereby a more even distribution of the plastic amongst the different packages.

The elevation procedure is shown in FIG. 6. Immediately before the starting of the elevation procedure the radiation heater element 72 is moved aside to leave place for a mandrel 73. Thereafter the cam disks 52 and 164 turn into a position in which the arms 50 and 64 are swung in clockwise direction and lift the elevation bar 49 for the mould bottom 46 and the guides 57, 58. All of the mould is then elevated together with the holder 48 upwards onto the weakened plastic disk 71. In given time relation with the plastic disk 71 getting in this way in a position to cover the mouth of the package 40, the valve 69 is turned over. This valve is, as already mentioned, introduced into a vacuum conduit, through which vacuum is fed to the space between the mould 41 and the package 40, inclusive of the ring-formed space between the packing 66, the upper edge of the sides of the mould, and the plastic disk 71. This space is tightened by means of the packing 66 against leakage outwardly. Further a packing is provided between the holder 48 and the framework 56. For insuring that the present air in the space thus closed shall have a possibility to deviate through the channel and the vacuum conduit 68, 69, recesses have been made in the inner sides of the mould walls 42 and 43 and of the mould bottom 46, said recesses being channel formed.

The card-board in the package frame 15, 16, FIG. 1A, however is so stiff, that it will not change its shape by being drawn in into said channels, and the channels therefore can freely conduct vacuum to all parts of the space to be evacuated.

Under influence of this vacuum is the weakened plastic disk 71 drawn down to form a cover on the package as indicated in FIG. 1B by 27. Simultaneously the mandrel 73 is lowered into the position shown in FIG. 7.

It is however now of utmost importance that the heat in the plastic disk should immediately b conducted away, so that it could not act destroying on the product packed in the package. For this purpose two different steps have been taken.

Firstly the mould sides are cooled by a coolant being brought to move through the channels 44, 45. This causes a quick cooling of the part of the cover, which is situated outside of the upper edge of the package 40. Secondly a cooling is provided also in connection with the mandrel 73, which is provided with cooling channels 74, 75 in connection with a source of coolant by means of flexible conduits 76, 77. At its downward movement the mandrel mill thus rapidly cool the part of the heated plastic disk 71, which is placed inside of the circumference of the upper edge of the package. The package, however, has during all of the time lapsed during the procedure passing the states according to FIGS. 2–4, been placed in the cooled mould, and as a consequence thereof has its material and especially the outmost parts thereof been cooled. Amongst these cooled parts is also the package frame of cardboard. When the plastic heated to weakness contacts the upper edge of the package, it will therefore also be cooled rather quickly.

It will be evident from the above, that the plastic only will be in its state, heated to weakness, during a very short interval of time, which is unavoidably necessary in order that it shall be possible to form it to a cover, in close contact with the package. During the heating period the plastic is not in close contact with the package, which is moved down to a depth below the plastic disk 71, which is undangerous for heating, and in direct connection with the forming of the plastic disk to a cover over the package, it is cooled by other means than the products packed in the package.

The release of the package provided with cover will now take place by movement of the different means, partly in the reversed order than the one just described. First the mandrel is drawn up from its position as shown in FIG. 7, into its normal position of rest fully above the remaining equipment in the machine. Thereafter the cam disk 52 turns thereby swinging the arm 50 in such a way that the bottom 46 is elevated from the mould, and this bottom thereby carries up the package in its movement. Simultaneously also the frame 65 is elevated so that the non-useful edge parts of the plastic disk are released and do not prevent the elevation of the package. The package 40, which is now provided with its cover, will be transferred in this way to the position, shown in FIG. 3, from which it is displaced sideward, for instance at right, so that it will replace the package 40 in FIG. 2. However, it may often be suitable in continuously working machines to store up a new set of packages 40, FIG. 2, during the time the above mentioned procedures run, said set of packages being in turn to be provided with covers, and in such a case, of course, the package which has already been provided with its cover, should be removed after its elevation in the same direction as the introduction of the new packages, that means from right to left in FIG. 2.

The non-useful edge part of the plastic disk still is attached to the cover. This part is cut away in a separate procedure, which does not form subject of the present invention and is therefore not described here. It is suitable that the cutting away of said non-useful part of the edge takes place by means of a stamp apparatus which will thereby leave a grip tounge at a corner or at a side of the package, whereby it gets easier to draw the cover away from the package.

In the machine, hitherto described, the removal of the package with its contents from the hot plastic disk during the heating period takes place by the package being lowered down to a level below that in which the plastic disk is situated. However, it is obvious that this removal may also take place in another way, for instance by the package being in a sidewards displaced position during the heating period relative to the heated plastic disk.

An arrangement of the last-mentioned type is schematically shown in FIG. 8. In this arrangement the machine is built according to the so-called turret principle. The turret rotates intermittently or continuously about its shaft 80. In the shown form of execution it is provided with four stations, but in practice it is, of course, suitable to build the turret bigger and provide it will essentially more stations. The four stations shown in the drawing, however, are the basic ones. The number of stations in a turret, which is only fed with one single set of packages to be provided with cover in each turn, may, of course, be made bigger. Thus one may for instance introduce a fifth station, in which the depression of the liner takes place by means of a mandrel, corresponding to the mandrel 73 in the above described form of execution. One may also instead of this fifth station or in addition thereto arrange for a sixth station, in which the cutting free of the edges of the plastic cover takes place. Such modifications, of course, are within the frame of the invention, but as they do not directly concern the general inventional idea, they will not be further described here.

The shaft 80 carries a couple of spoke-like disks or wheels, only the upper one 81 of said wheels being visible in FIG. 8. Between the four spokes are the apparatus arranged, which have to take care of the different functions being carried through.

The packages are fed into the first station 82 in a position below the apparatus 83 from a conveyor 84' in the direction of the arrow 85' so that a given number of packages in a given pattern are placed to be provided with a cover. In the form of execution shown these packages 84" are arranged in two parallel rows, each comprising six packages, so that in each covering procedure twelve packages will in total be provided with covers.

The intention now is that plastic, which has been heated in advance, should be transferred to the packages in order to form the cover on them. The plastic is preferably fed from a fixed roller 85", which is hinged between a couple of side support pieces 86 on a shaft 87, geared in these side support pieces 86. The strip of plastic drawn off from said roller is moved forwardly by means of friction rollers 88, which may for instance rotate one revolution in order to feed a length of the strip of plastic, which is so adapted, that it will be sufficient to provide the twelve packages 84" with their covers. The rollers 88 are driven intermittently one revolution each time when such a length of the plastic strip should be fed. The movement is transferred from a shaft 89.

Immediately after the feeding of the plastic strip is completed, it is cut off by a scissor 90 and spanned into a transportation frame 91. When thereafter the turret has rotated one step, the set of packages which has been provided with covers in the apparatus 83, is moved to the station 92, where de-loading takes place in the direction of the arrow 93 over a path 94.

The holder 95' is now empty and moves at the next step of the turret to a position in which a cut off piece of the strip of plastic from the roller 85" is fed into same. There it is clamped by means of a frame, which may be mainly of the same shape as the frame 65 of the earlier form of execution. For each step taken by the turret, a piece of the plastic strip is fed in this way, is cut off and is clamped, and thereafter the holder is rotated one step on to the station 95", where the plastic is heated by radiation from an element 96, so that it is weakened. The plastic thus weakened is thereafter brought to the station 82, where meantime a new set of twelve packages is fed in so that this set is in turn to be provided with a cover.

The arrangements for providing the set of packages with a cover may principally be equal to the corresponding arrangement in the earlier described machine according to FIGS. 2–7, however, with the difference that no special arrangement is required for lowering the packages. This lowering arrangement was, as a matter of fact, intended in the first place for moving the package with its contents of a product sensitive to heat out from the range of influence from the heat existing during the heating period of the plastic, but, as the heating of the plastic takes place in an earlier station in the arrangement according to FIG. 8, from which no appreciable heat radiation will be given to the packages, there is also no lowering of the packages required.

The plastic, on the other side, still contains an essential quantity of heat, and in many cases it is therefore important that the arrangement in the station 82 contains cooling means for quick cooling of the plastic, so that it will get no opportunity to give off any appreciable amount of heat to the packages and their contents of material sensitive to heat.

Thus, in the machine according to FIG. 8 a set of packages is covered simultaneously with plastic. This set is connected by means of the intermediate pieces of plastic between the containers in the packages, and at the cutting free in the above described manner, the different packages are separated from each other.

One may in a similar way also introduce a full set of packages in moulds in the arrangement according to FIGS. 2–7, said packages being arranged under one common plastic disk, so that covers are mounted on all of the packages in such a set. Of course, it is not necessary that the set of packages should just comprise two rows, each comprising six packages, but one may arrange one or more packages in any suitable way, and each set of simultaneously treated packages may therefore contain any deliberate number of packages.

The invention, of course, is not limited to one or the other one of the two forms of execution, described above and shown in the drawings, but all kinds of different modifications may be made within the frame of the invention.

I claim:
1. An apparatus for applying a closure formed of thin, heat deformable sheet material to the open end of a generally cup-shaped package comprising, a first support means for supporting the package, a second support means for supporting the thin sheet material so that one side thereof faces the open end of the package, said first and second support means being movable relative to each other for moving the package and the thin sheet towards and away from each other, heating means located on the side of the thin sheet opposite from the package for heating the thin sheet while it is being held by the second support means, forming means for forming the heated thin sheet onto the open end of the package to close the package, and means for substantially completely enclosing the space between the package being held by the said first support means and the thin sheet being held by said second support means when the package and the thin sheet have been moved towards each other as well as when the package and the thin sheet have been moved away from each other by relative movement of the first and second support means.

2. The apparatus of claim 1 including means for moving the first support means away from the second support means to move the package away from the thin sheet being held by the second support means, and wherein said heating means includes a heating element adapted to be moved towards the thin sheet to heat the thin sheet when the package has been moved away from the thin sheet.

3. The apparatus of claim 2 wherein said forming means include vacuum means for drawing the heated thin sheet onto the package after the package and the thin sheet have been moved towards each other, to close the said open end, and said first support means including a mould for holding the package and including a channel leading from the interior of said mould to said vacuum means.

4. The apparatus of claim 3 wherein said forming means further includes a mandrel adapted to be lowered into said package for depressing the thin sheet to a level below the upper edge of the package.

5. The apparatus of claim 4 wherein the said mould includes a bottom member separated from the sides of the mould, which bottom member normally rests on a holding member, and including means for elevating said bottom member to a level above the sides of the mould for receiving or discharging a package and thereafter lowering said bottom member to its rest position on the holder member.

6. The apparatus of claim 5 wherein said holding member is carried in a frame, and wherein said holding member is vertically displaceable in said frame, and including controllable guide means for moving said holding member in said frame.

7. The apparatus of claim 6 including a bar member attached to said bottom member and passing through said holding member, and including a second controllable guide means for moving said bar member and said bottom member together.

8. The apparatus of claim 7 in which at least one of said controllable guide means includes a cam and a cam disc for guiding movement of its controlled members, and including spring means for holding the cam disc onto its cam.

9. The apparatus of claim 4 wherein said mandrel includes cooling channels connected to a conduit for receiving a cooling medium.

10. The apparatus of claim 9 including flexible conduit means for connecting the cooling channels in the mandrel to a source of coolant medium.

11. The apparatus of claim 3 wherein said mould includes cooling channels connected to a conduit for receiving a coolant medium.

References Cited

UNITED STATES PATENTS 2,989,827  6/1961  Groth _____ 53—141 X
3,260,032  7/1966  Hill et al. _____ 53—112

FOREIGN PATENTS 649,756  10/1962  Canada.

TRAVIS L. McGEHEE, *Primary Examiner.*
R. L. FARRIS, *Assistant Examiner.*

U.S. Cl. X.R.

53—329